(12) United States Patent
Indreland

(10) Patent No.: US 8,596,915 B2
(45) Date of Patent: Dec. 3, 2013

(54) METHOD AND TOOL FOR INSTALLING NEW PIPE UNDERGROUND

(76) Inventor: Helge Sten Indreland, Steinbru (NO)

( * ) Notice: Subject to any disclaimer, the term of this patent is extended or adjusted under 35 U.S.C. 154(b) by 53 days.

(21) Appl. No.: 12/734,519

(22) PCT Filed: Nov. 20, 2008

(86) PCT No.: PCT/NO2008/000414
§ 371 (c)(1),
(2), (4) Date: May 6, 2010

(87) PCT Pub. No.: WO2009/067024
PCT Pub. Date: May 28, 2009

(65) Prior Publication Data
US 2010/0236828 A1    Sep. 23, 2010

(30) Foreign Application Priority Data

Nov. 20, 2007   (NO) .................................. 20075969
Oct. 23, 2008   (NO) .................................. 20084483

(51) Int. Cl.
*F16L 1/028*    (2006.01)
(52) U.S. Cl.
USPC .......................................... 405/184; 175/19
(58) Field of Classification Search
USPC ............... 405/174, 184, 184.1, 184.2, 184.3; 175/19, 22; 254/135.3 FR, 134.3 R, 254/134.4
See application file for complete search history.

(56) References Cited

U.S. PATENT DOCUMENTS

| | | | | | |
|---|---|---|---|---|---|
| 176,201 | A | * | 4/1876 | Scott | 405/184 |
| 1,894,446 | A | * | 1/1933 | McKenny | 173/112 |
| 2,902,832 | A | * | 9/1959 | Levy et al. | 173/128 |
| 3,255,591 | A | * | 6/1966 | Thornley | 405/225 |
| 3,599,731 | A | * | 8/1971 | Lawlis | 173/88 |
| 5,921,591 | A | * | 7/1999 | Argent | 285/330 |
| 6,585,453 | B2 | * | 7/2003 | Robinson | 405/184.3 |
| 6,702,521 | B2 | * | 3/2004 | Robinson | 405/184.3 |
| 2008/0286051 | A1 | * | 11/2008 | Duggan | 405/184 |

* cited by examiner

*Primary Examiner* — David Bagnell
*Assistant Examiner* — Kyle Armstrong
(74) *Attorney, Agent, or Firm* — Francis C. Hand; Carella, Byrne, et al

(57) ABSTRACT

A pipe is installed between a pointed front section and a rear section of a tool, and the rear section is subjected to a drive force in the longitudinal direction, so that the pointed section and the pipe is pushed into loosely packed materials. In response to an inadvertent hindrance in the loosely packed materials, the tool and the pipe connected thereto is pulled back by exerting a tractive force on a line connected to the pointed front section and running through the pipe and rear section.

12 Claims, 2 Drawing Sheets

METHOD AND TOOL FOR INSTALLING NEW PIPE UNDERGROUND

The present invention relates to a method for construction of a pipe through a fill of loosely packed materials, where the pipe is installed between the pointed front section and the rear section of a tool, and the rear section is subjected to a drive force in the longitudinal direction, so that the pointed section and the pipe is pushed into the loosely packed materials. The invention also relates to a tool for bringing about drilling through a fill of loosely packed materials.

The invention specifically relates to a tool that can be connected to a pipe to be laid through the fill, where the pipe is used for either leading fluids such as gas and liquids, such as water, sewer, combustible gasses and so forth, or the pipe is to be used for laying cables of different types. The expression fill is meant to encompass a mound of loosely packed materials for the construction of roads, the layout of railroad lines, and so forth. Loosely packed materials encompass a detritus or gravel volume that can be made up of a combination of everything from fine grained sand to coarse ballast and stones.

As mentioned in the introduction, it is presently known to lay down pipes and cables that are to cross through a fill as mentioned above, by drilling through the fill, without removing the asphalt layer or road surfaces. As concerns known solutions of this type, please see U.S. Pat. Nos. 2,902,832 and 1,894,446.

But in many such cases this operation must be carried out by breaking up and removing the entire top layer, and then digging a trench through the fill. The necessary pipes and cables are then laid in said trench before it is filled up and a new road surface is laid on top. One of the problems that arise is that such road surfaces are almost newer level with the existing road surface, and a virtually uncorrectable hump in the road results.

The government thus poses very high requirements to what kind of purposes that can qualify for permissions to dig a trench through a road fill.

The invention relates to the above mentioned method, which comprise of drilling through the fill without the need to break up the top layer. In many instances one does not have a general view of the loosely packed materials in the fill, and there may be boulders therein that may not be penetrated by drilling tools. In such instances it may be that both the point and the elements it pulls must be left behind in the fill.

One object of the present invention is to bring forth a solution for handling a situation where it turns out that the point cannot be guided all the way through the fill due to an inadvertent hindrance in the fill.

Thus, it is an object of the present invention to bring forth a tool to bring about drilling through a fill, for laying pipes, cables, etc.

The method for laying pipe through a fill of loosely compacted materials is characterized by that in the event that the progress is stopped due to an inadvertent hindrance in the loosely packed materials, the tool and the pipe connected thereto is pulled back by exerting a tractive force on a tractive means connected to the pointed front section.

According to a preferred embodiment of the invention a retractile means such as a line connected to the front section is utilized, and the line runs within the pipe connected to the rear section, and the retractile force is controlled by the tool operator. According to another embodiment a line such as a wire or a chain, or a combination of these, is used.

According to an aspect of the present invention the tool is characterized by comprising a means connected to the pointed front tool section, and means to exert a tractive force on said means, in order to, in the event that the progress is halted due to an inadvertent hindrance in the fill, retracting and removing pipes and tools from the fill.

According to an aspect of the invention the method and tool according to the present invention is used to bring about a boring through the fill, and particularly to locate pipes through a fill, which is used to lead fluids such as gas and liquid, for example water, sewer, combustible gasses and so forth, or the pipe is used to lay cables of different types.

According to the mentioned U.S. Pat. No. 1,894,446, which comprises solutions for pounding pipes through fills of loosely packed materials, a wire 36 is used, which is arranged in coils, in order to anchor the rig to the point where the pipe is to be inserted into the fill. Further, the US-patent states that this wire is also used to retract the rig from the construction zone, and thus pull out the entire pipe construction of screwed together pipe part sections, when there is an impassable hindrance in the fill. This solution can however not prevent pipe parts from coming loose from each other inside the fill during the retraction. Thus, the present invention comprises a further development of the objects of the US patent, by locating the fastening point of the wire at the end of the pipe assembly. The present invention has considerable benefits.

The present invention will now be explained in more detail with reference to the following figures, wherein.

Figure 4:
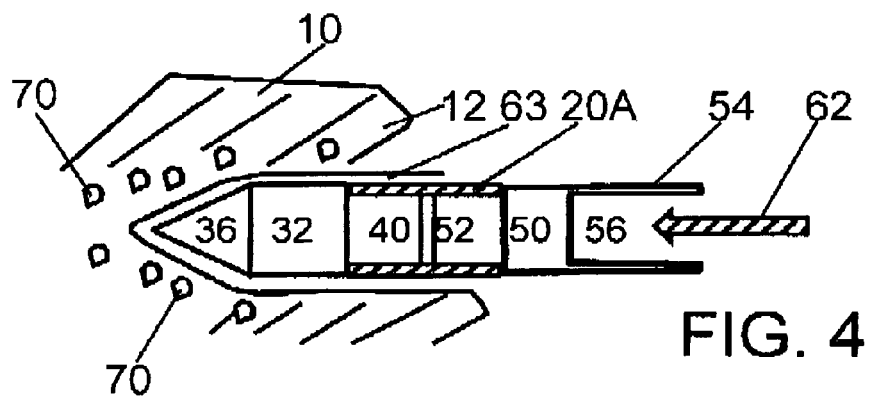
Figure 5:
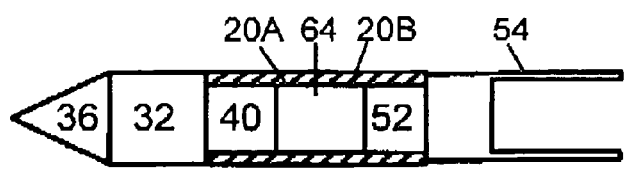

FIGS. 4 and 5 outline how a pipe divided into sections is mounted to the tool, in cases where the pipe is relatively long.

Figure 1:
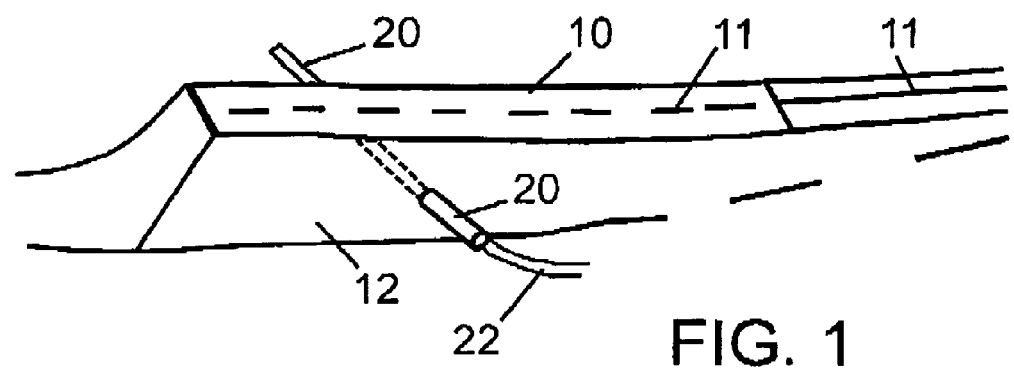
FIG. 1 shows a road fill that is drilled through transversely, where a pipe is positioned.
Figure 6:
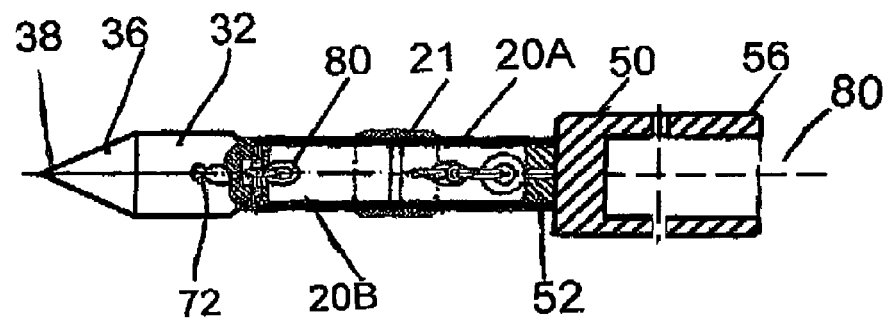

FIG. 6 shows more detailed how a chain comprises line 80 and is connected to the parts.

Figure 2:
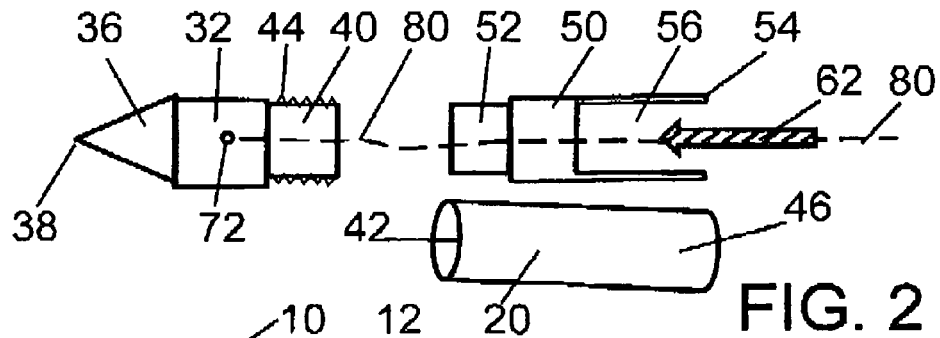
FIG. 2 shows a perspective drawing of the two parts of a tool according to the present invention.

The median of the road is shown at 11. A steel pipe 20 (or of a different metal) of the types mentioned earlier runs through the fill. As an example pipe 20 is continued as hose 22 continuing on to a not shown area. The invention relates to a method and an apparatus for leading the pipe through the road fill. The apparatus has two parts, a front end 32 and a rear end 50 as drawn on FIG. 2. As a basis the two ends 32, 50 have a cylindrical shape. The front end 32 forms a pointed front part 36 with point 38. In addition, the front end 32 has a rear cylindrical massive tap shape 40. The tap 40 is constructed to receive the front end 42 of a pipe 20, which is threaded onto tap 40. The outer diameter of tap 40 approximately corresponds to the inner diameter of pipe 20. A ring shaped flange 44 with a "height" corresponding to the thickness of the wall of the pipe is formed by the transition to front end 32. Pipe 20 is introduced onto tap 40 so that the pipe end 42 will but up against flange 44. Pipe 20 preferably comprises internal threads, and is screwed onto the outside thread tap 40.

The rear end 50 of the apparatus comprises a corresponding forward cylindrical massive tap shape 52. The tap 52 is oriented to receive the rear end 45 of a pipe 20 that is threaded onto tap 52. The outer diameter of tap 52 corresponds approximately to the inner diameter of pipe 20, such that the pipe can be pressed onto the rear end of the apparatus (a press fit). As for the pipe connection at the front end, the rear end 50 is fastened to the pipe with a screw connection. A4 As is apparent on the figures the rear end 54 of the rear end 50 forms a hollow space 56 for mounting a rotary percussion drill, shown schematically by arrow 62. The rotary percussion drill 62 (not shown) comprises a hydraulic tool for chiseling rocks, and is used to transfer powerful strikes with high frequency against the rear end 50, and the energy is transferred by the massive pipe 20 to the front part 36. The front end 32 is thus struck through the fill and forms a boring 63 (See FIG. 3) through the fill that the pipe lays in, and partially smashes and/or pushes aside smaller rocks it encounters in the fill.

Figure 3:
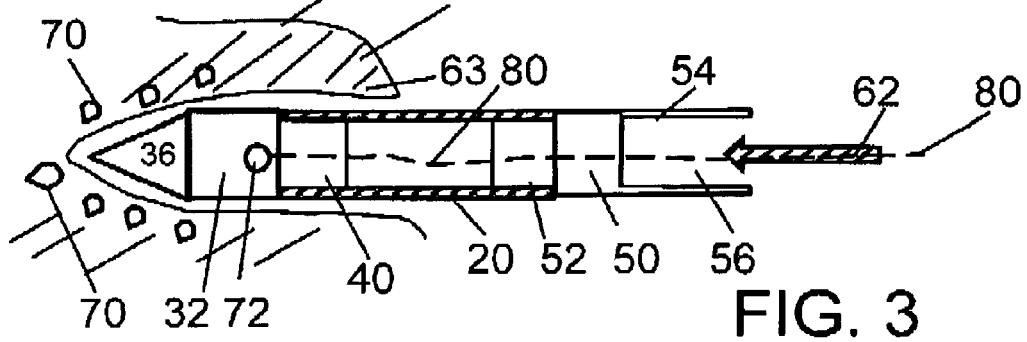
FIG. 3 shows how a pipe is mounted to the two tool parts according to the present invention.

FIGS. 3 and 4 draw schematically the fill 12 and the over laying road 10, that is not to be influenced by laying the pipe through the fill. Around front end 36 there is schematically shown stones 70 in fill material 12, which is influenced by the strikes.

The pipe is thus pushed inwards with the front end in the front. When the pipe is pushed through the fill, the tool is dismantled, and the pipe laying is continued by other means. The pipe 20 is left passing through the fill, and may also be utilized for laying (as a draw pipe) conducts and cables of all imaginable types and purposes.

On the figures, and especially FIG. 6, it is drawn how the tool is equipped with a pull line 80, for the instances where there is an inadvertent hindrance that makes it so one cannot manage to strike the pipe and the point through the fill. The pull line is fastened to the pointy front end 32 by point 72, and can comprise a wire or a chain, or a combination of wire and chain. It stretches backwards through the pipe parts 20 and backwards to the rear tool part where the operator may carry out a controlled retraction by pulling on the line. This retraction is preferably carried out by machinery. During such an operation with retraction, it is important that the parts do not come loose from each other internally, which may lead to that the pipe parts may become wedged stuck in the fill, and become impossible to remove. Therefore the wire must be kept very taut during the retraction. At the same time this tautness is ensured by connecting the wire/chain at the very front of the front end 32. According to a preferred embodiment, the wire/chain-links are mounted with an a in advance sufficient tautness, so that the pipe parts cannot fall apart and get wedged in the loose matter during the retraction. FIG. 6 shows in more detail how the chain comprises line 80, and is connected to the parts. It is clear that a pipe that is mounted in between the two parts of the tool cannot be too long before one risks the formation of deformations as a result of the high frequency strikes. Thus, it is possible to divide the process into more steps, by starting with a smaller pipe 20A that is struck into the fill until it has gotten so far in as suggested on FIG. 4. Then a next pipe length 20b is connected to the first pipe length 20A, and the rotary percussion drilling continues. The joint is shown by 64 on FIG. 4. In such a manner new pipe sections are continually added to the prior one until one has gotten through the fill. The pipe sections may for instance be connected by a screw connection, as is well known in the field. It has however become apparent that threads for screw connections may be easily deformed when the montage is "struck" through the volume of the road fill. Thus it is preferred that the pipe parts are connected by a press fit. Such a press fit between two adjoining parts may be opened easier than two sections that are screwed together, and the screw threads are deformed.

The tool according to the present invention, with the two parts, is constructed of steel, with a quality that makes it so they can withstand large loads from the rotary percussion drilling as described above. The area around the tip is especially hardened in order to withstand powerful strikes against stones without incurring damage. This should be so to both crush the stones and push them aside during the progression and lying of the pipe through the fill materials.

According to the present invention the mounting of the two tools with the pipe mounted in between, is mounted to a rig or a framing that places the pointed front end against the fill volume to be penetrated.

According to the present invention it is also possible to use the pipe in order to bring forth a clean boring 63 through the fill, and then retract the pipe, by using the technique as mentioned, especially in connection with FIG. 6. This may occur if the fill volume consists of a more compact mass, with a more fine grained consistency, so that stabile inner walls are formed in the drilled hole 63. In experiments with the present invention a tool for laying pipe was used, which had a diameter of about 110 mm, 180 mm, and up to 400 mm, during the construction work at a road fill, without encountering any problems. During the experiments the hydraulically operated rotary percussion drill of a digger was used. Both the tool and the pipe has been mounted to a framed rig and adapted so the rotary percussion head of the digger could be mounted to the back end of the tool. Thus, one has been able to establish a stabile support for the entire mounting of pipes, front and rear tool parts. By the aid of the rotary percussion head one has been enabled to push the mounting forward against and into the fill volume, and the striking of the machine was started with a suitable strike frequency' as needed, as is well known for such machines.

The big advantage of this invention is that the tool can be operated with standard construction equipment that comprises a rotary percussion unit, as is available at most construction sites, and that is easy to get hold of when an procedure for laying pipe through a already existing fill arises, without damaging or breaking the "sensitive" road surface.

The invention claimed is:
1. A method of laying pipe through loosely packed materials comprising the steps of
  installing a pipe between a pointed front end and a rear end of a tool;
  connecting a line to the pointed front end and extending the line through said pipe;
  subjecting the rear end of the tool to a drive force in the longitudinal direction for pushing the pointed front end and the pipe into the loosely packed materials,
  exerting a tractive force on the line in response to a hindrance in the loosely packed materials causing a halt to the pushing of the pointed front end and the pipe into the loosely packed materials to retract the pointed front end and the pipe from the loosely packed materials.
2. The method as set forth in claim 1 wherein the tractive force is controlled by a tool operator.
3. The method as set forth in claim 1 wherein the pipe is divided into a plurality of sections characterized by that
  a) a first pipe section of said sections is introduced a given length into the loosely packed materials by said drive force, and
  b) thereafter the rear end of the tool is removed from the first pipe section, and a second pipe section of said sections is connected with the first pipe section and the rear end of the tool is mounted on the second pipe section, and the first pipe section and second pipe section are driven further into the loosely packed materials.
4. The method as set forth in claim 3 wherein the loosely packed materials form a fill for a roadbed and the first pipe section is pushed from one side of said fill top an opposite side of said fill.
5. The method as set forth in claim 4 wherein the rear end of the tool is subjected to said drive force and an impact of a given frequency.
6. A tool for laying pipe through loosely packed materials comprising
  a pointed front end for mounting on a front end of a pipe and pushing through the loosely packed materials;

a rear end for mounting on a rear end of the pipe and for application of a drive force thereon for pushing said pointed front end and the pipe into the loosely packed materials;

a line connected to said pointed front end and extending through said rear end; and means for exerting a tractive force on said line to retract said pointed front end and the pipe from the loosely packed materials.

7. The tool as set forth in claim 6 wherein said line is a chain extending through said rear end.

8. The tool as set forth in claim 6 wherein said front end has a threaded tap for threading a front end of a pipe thereon.

9. The tool as set forth in claim 8 wherein said front end has a ring shaped flange between said threaded tap and said pointed front end of a height corresponding to the wall thickness of a pipe threaded onto said threaded tap.

10. The tool as set forth in claim 6 wherein said rear end has a threaded tap for threading a rear end of a pipe thereon.

11. In combination a pipe:

a tool for laying said pipe through loosely packed materials, said tool having a pointed front end secured to a front end of said pipe for pushing through the loosely packed materials and a rear end secured to a rear end of said pipe for application of a drive force thereon for pushing said pointed front end and said pipe into the loosely packed materials;

a line connected to said pointed front end of said tool and extending through said pipe and said rear end of said tool; and means for exerting a tractive force on said line to retract said pointed front end and said pipe from the loosely packed materials.

12. The combination as set forth in claim 11 wherein said rear end of said tool has a forward cylindrical tap receiving one end of said pipe and a hollow space at an opposite end for receiving a percussion tool.

* * * * *